United States Patent [19]

Reinnagel

[11] 4,025,673

[45] May 24, 1977

[54] METHOD OF FORMING COPY RESISTANT DOCUMENTS BY FORMING AN ORDERLY ARRAY OF FIBERS EXTENDING UPWARD FROM A SURFACE, COATING THE FIBERS AND PRINTING THE COATED FIBERS AND THE COPY RESISTANT DOCUMENT RESULTING FROM SAID METHOD

[76] Inventor: Richard E. Reinnagel, 60 E. Jerge Drive, Elma, N.Y. 14059

[22] Filed: Mar. 27, 1975

[21] Appl. No.: 562,512

Related U.S. Application Data

[62] Division of Ser. No. 243,743, April 13, 1972, Pat. No. 3,887,742.

[52] U.S. Cl. .................................. 428/29; 40/137; 283/6; 283/7; 355/133; 427/197; 427/198; 427/203; 427/264; 427/289; 428/91; 428/96; 428/141; 428/163; 428/167; 428/168; 428/173; 428/204; 428/207; 428/323

[51] Int. Cl.² ................. B32B 33/00; B42D 15/00; B44F 1/00; D06C 11/00

[58] Field of Search ........... 355/133; 427/197, 198, 427/203, 264, 289; 428/29, 913, 88, 90, 91, 96, 141, 163, 167, 168, 173, 204, 207, 323; 40/137; 283/6, 7

[56] References Cited

UNITED STATES PATENTS

| 824,860 | 7/1906 | Grove | 40/137 |
|---|---|---|---|
| 1,651,248 | 1/1927 | Bouin | 428/29 |
| 3,653,138 | 4/1972 | Cooper | 40/137 |
| 3,750,316 | 8/1973 | Braunhut | 40/137 |
| 3,878,631 | 4/1975 | Mileham | 40/137 |
| 3,887,742 | 6/1975 | Reinnagel | 428/913 |

FOREIGN PATENTS OR APPLICATIONS

| 749,822 | 5/1933 | France | 40/137 |
|---|---|---|---|
| 809,379 | 3/1937 | France | 40/137 |
| 109,040 | 2/1925 | Switzerland | 40/137 |
| 1,271 | 1/1908 | United Kingdom | 40/137 |
| 411,178 | 6/1934 | United Kingdom | 40/137 |

*Primary Examiner*—J.C. Cannon
*Attorney, Agent, or Firm*—Allen J. Jaffe

[57] ABSTRACT

Methods for treating or producing original documents to inhibit, if not preclude, the reproduction of such documents by copying processes. The documents so produced favor the visual response of the human eye over the physical response of a copying machine so that the graphical information imprinted on the document background is readily perceptible by the human eye but imperceptible by the sensor and associated processes of a copying machine.

3 Claims, 12 Drawing Figures

METHOD OF FORMING COPY RESISTANT DOCUMENTS BY FORMING AN ORDERLY ARRAY OF FIBERS EXTENDING UPWARD FROM A SURFACE, COATING THE FIBERS AND PRINTING THE COATED FIBERS AND THE COPY RESISTANT DOCUMENT RESULTING FROM SAID METHOD

This is a division of application Ser. No. 243,743, filed Apr. 13, 1972 and now U.S. Pat. No. 3,887,742.

BACKGROUND OF THE INVENTION

This invention relates generally to the production of documents and the like having copy resistant characteristics and, more particularly, to copy resistant documents and to methods for treating or producing original documents in such a manner so as to yield easily readable documents under normal reading conditions but inhibiting, it not preventing, the reproduction of intelligible copies thereof by conventional copying processes.

Copying machines have become increasingly popular in recent years and can be found in most business offices and in public areas, such as shopping centers, hotel lobbies and the like. Because of the widespread availability of various types of copying machines, the ease with which they can be operated, and the low cost of each copy, virtually all documents are susceptible to being copied by anyone without the consent of the originator or owner. While the development of these copying machines certainly represents progress in the graphical communication field, they are often used to copy documents which may be abusive to the originator or owner. For example, the unauthorized and indiscriminate copying of materials such as news letters, poems, sheet music, drawings etc. may violate the legal rights of the publishers and/or authors denying to them the compensation to which they are entitled. Also, security can be flagrantly breached by copying material of a sensitive nature such as classified government information, industrial and commercial data, and personal correspondence of a confidential nature.

SUMMARY OF THE INVENTION

Accordingly, it is a primary object of the present invention to provide copy resistant documents and methods for producing or treating original documents so as to inhibit, if not prevent, the reproduction thereof by conventional copying machines and processes.

It is another object of this invention to provide original documents which favor the spectral response of the human eye over the spectral response of a conventional copying process.

It is another object of the present invention to provide improved color contrast between an original document background and the graphical information imprinted thereon which is readily distinguishable by the human eye but poorly discernible by the sensor of a copying machine.

It is still another object of this invention to provide density or reflectance contrast between an original document background and the graphical information imprinted thereon which is readily distinguishable by the human eye but poorly discernible by the sensor of a copying machine.

It is another object of the present invention to provide multi-contrast density or reflectance printing on an original document background to generate confusion in the copies reproduced by a conventional copying process.

It is yet another object of this invention to provide a method of producing obliterating patterns in the viewing path of the original document that are related to the angle of viewing.

It is a further object of the present invention to provide a color or reflectance contrast between an original document and the graphical information imprinted thereon which is related to the angle of viewing the document.

It is still a further object of this invention to form either the original document background, or the graphical information imprinted thereon, or a film overlying the document, from photochromic, phototropic and photothermic materials which affect the contrast between the background and the graphical information under varying conditions of light and heat.

It is a further object of the present invention to employ any one, or any combination of the foregoing methods, to produce a document having varying degrees of copy resistance.

The foregoing and other objects, advantages, and characterizing features of the present invention will become clearly apparent from the ensuing detailed description thereof, taken together with the accompanying drawings wherein like reference characters denote like parts throughout the various views.

DETAILED DESCRIPTION OF ILLUSTRATIVE EMBODIMENTS

Figure 1:
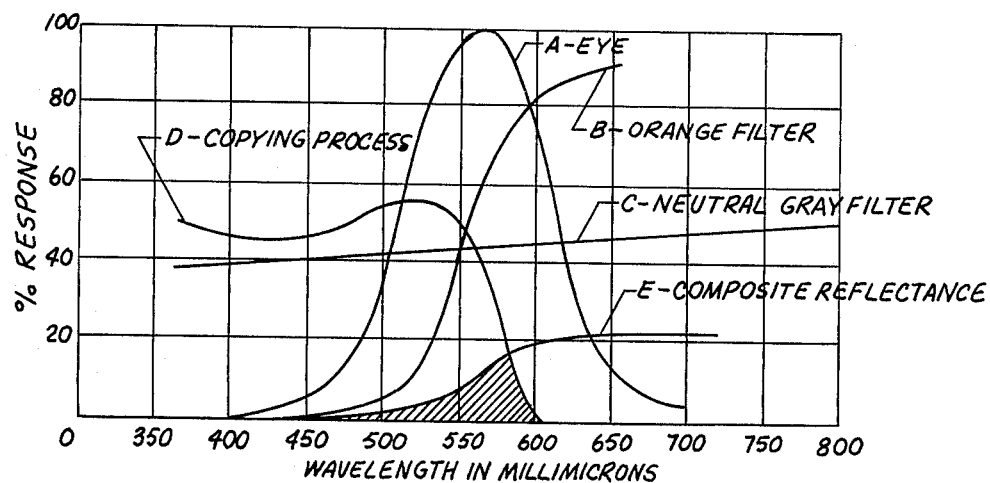
FIG. 1 is a diagrammatic view illustrating the effects of color and low reflectance filters on a graph which correlates the color or spectral response of the human eye and a copying machine in percentages to wavelengths of light in millimicrons.

While the known copying processes and machines utilize widely different principles of operation, they are all dependant upon an inherent or induced contrast between the background sheet material of a document and the graphical information imprinted thereon for the development of an image on a sensitized surface on, or from which, the copy is produced. The expression "graphical information" as used herein includes words, letters, numerals, drawings, graphics, etc. or any indicia that can be imprinted on a background sheet of material. The required contrast can be in the form of a color difference between two colors of the same density or reflectance, or a reflectance contrast between two shades of a given color, such as a light blue color as opposed to a dark blue color, or a combination of both color contrast and reflectance or density contrast. Reflective or density as used herein is: Log 10 (Incident light/Reflected light). Reflectance can also be expressed as the percentage of the incident light that is reflected. The spectral or color sensitivity of these known copying machines do not match the sensitivity and density range of the human eye.

Density range is conveniently referred to as the range of values of reflectance over which the eye can recognize a change in reflectance. The eye may not recognize a slight change in reflectance when the reflectane is near 100% as in white, or 0% as in black. The eye tends to have a linear response to changes in density between 0.05 and 1.05, corresponding to a reflectance of 90% and 8%, respectively. Copying processes generally have a much smaller dynamic range than the eye, such as 0.3 to 0.6, and this density range can generally be moved between the limits of 0.05 and 1.05 by an adjustment of the exposure control on the machine. The limited dynamic range of these copying processes tends to produce a black and white copy with poorer gray scale than in the original.

The principles of this invention contemplate a multiplicity of techniques, which can be used singly or in combination, to treat an original document in such a manner as to affect the color and/or reflectance or density contrast between the background and the graphical information to maintain the original easily readable, or to render the document readable at certain viewing angles, but to adversely affect the image reproduced by the copying machine to produce a copy which is unintelligible or at least less intelligible than the original document. Stating this another way, the original is treated so as to favor the responses of the human eye but inhibit the responses of copying machines to prevent the production of a usable copy. It should be appreciated that the degree of copy resistance imparted to the original is generally dictated by the sensitivity of the material disclosed in the document, and, since any document can be manually copied, the extent of copy resistance need only be sufficient to render automatic or direct copying by means of copying machines at least as expensive and more complicated than manual copying. The term "original" as used herein is intended to embrace any document to be copied, whether it be the true original or a copy or reproduction thereof.

It should be understood that the methods, hereinafter described in detail, are generally combined to produce documents capable of resisting reproduction by the various known copying machines and the selection of a particular method, or combination of methods, will be dictated by the specific copying machines intended to be defeated as well as by the degree of copy resistance desired and the acceptable degradation in readability. Also, it must be realized that the copying machine operator can modify the machine in an effort to overcome the resistance to copying imparted to the document by the methods of this invention by adjusting the exposure control for better contrast and/or by superimposing a filter on the original to modify any color contrast between the background and the graphical information imprinted thereon. Thus, the method or combination of methods selected must provide the desired level of copy resistance when such simple operator actions are taken.

In accordance with this invention, one method employed to favor the spectral response of the human eye over the spectral response of the copying machine is in the selection of different colors or color filters. The choice of a color or colored filter should be based upon the spectral sensitivity or color response of known copying machines and the human eye and optimized to obtain the least loss in contrast and reading comfort while yielding a maximum in color contrast reduction at the copying machine receptor, with due consideration given to the spectral characteristics of the source of illumination for both the copy machine and the human eye. I have found, through experimentation with various colors within the total visual spectrum that a warm or dark orange background having black graphical information imprinted thereon produces a very comfortable and pleasing background for the black graphical information. This orange color materially reduces the capability of most copying machines to produce a readable copy and requires the machine to be adjusted to maximum exposure. The color can be applied to the paper stock as a dye or as a coating before the graphical information is printed on the background.

I have also found, through experimentation with various colored filters of equal attenuation, that a warm or dark orange filter overlying an original document having a white background and black graphical information imprinted thereon effects a pleasing background for the black graphical information. Indeed, such an overlay produces a document as easily read as the original but materially reduces the capability of most copying machines to produce a readable copy. The filter can be provided in the form of a film of a transparent colored plastic material or of a clear plastic material provided with a colored adhesive and applied to the document to be protected by any suitable or conventional laminating process, or the film can be produced as a pressure sensitive tape adapted to be applied from a roll to cover the entire surface of the document, or only isolated areas thereof, as desired. In business offices, the film could be dispensed from a specially designed machine attached to the office copying machine and applied to the copies reproduced from the original so as to prevent such copies from being further copied by the various known copying systems.

Another form of this invention is the utilization of low reflectance backgrounds with low reflectance graphical information imprinted thereon. It is known that "dark" or deep colors reflect less light than bright or light colors. Thus, dark or low reflectance graphical information disposed on a low reflectance background reflects less of the incident light and therefore less energy to the sensor or image forming surface in light-activated copying machines. When low reflectance or dark backgrounds are used with low reflectance graphical information, the copying process must usually be adjusted to operate at maximum exposure to yield a useful copy, if indeed a copy can be made. I have found that a gray background density of 0.4, when used with printing inks of densities above 1, will produce marginally readable copies when the copy machine is operated at the maximum exposure condition. However, the originals so produced are very comfortable and easy to read.

Through the use of a background material which incorporates both selective color or spectral response and low reflectance, an optimum combination can be selected to yield a document which is easily read, yet difficult to impossible to copy. To this end, I have found that the combination of a warm orange filter and a neutral "optical attenuator", such as a neutral gray filter, which transmits approximately 50% of the incident light, used as an overlay on white paper with black printing, effects a sufficient reduction in contrast to defeat virtually all of the known copying systems.

FIG. 1 graphically illustrates the effect of the combination of a color filter and a low reflectance filter on a graph which correlates the color or spectral response of the eye and a typical copying process in percentages to light wavelengths measured in millimicrons under conditions of uniform, illumination over the spectrum. Curve A identifies the color response of the eye; curve B represents the transmission of light of the orange filter; curve A the transmission of light of the neutral optical attenuator or gray filter; curve D identifies the typical color response characteristics of a conventional copying process; and curve E designates the composite reflectance of the orange and neutral gray filters or the percentage of the incident light which is reflected from a white substrate covered with the orange and neutral gray filters. This latter curve represents the reflected light which reaches the detector or sensitized area of the copying process and, of course, the eye when the document is being read. The portion of this light which is effective in the copy process is that which is within the spectral response of the machine, or within the shaded area shown in FIG. 1. Similarly, only that portion of this light which is within the spectral response of the eye will be effective in the reading process. From an inspection of the graph of FIG. 1, it is seen that the color of the filter can be modified and the density of the neutral density filter can modified in such a manner so that their combined effect on an original document will minimize the useful light reflected in the copy process but maximize readability of the original. Again these filters can be provided in the form of films laminated or otherwise fixedly secured to the original, or only applied to isolated areas thereon, as desired. Also, pigments, dyes, or coatings formed in or on the background sheet of material prior to imprinting the graphical information thereon can be used in lieu of the above described filters and films, if desired, within the purview of this invention.

A third form of this invention is to imprint the graphical information at several gray levels on a background of uniform contrast to generate confusion or errors in the copy reproduced therefrom. The human eye has excellent gray-scale resolution; i.e., it can differentiate between a multiplicity of shades of gray, ranging from white to black. Light responsive copying machines generally reproduce all of the lighter shades of gray on one side of a selected median as white, and the darker shades on the other side of such median as black. The median shade or white-black transition point can usually be shifted by adjusting the exposure so that the machine sometimes can produce a copy of greater contrast than the original. This gray scale characteristic can be utilized to generate confusion in the copy which is not as apparent in the original.

To illustrate one aspect of this confusion generation concept, a character such as the letter "E" for example can be formed on the original with varying gray scale characteristics, say from dark at the top of the letter to light at the bottom thereof. This letter would be reproduced in the copy as a solid black E or as an F, depending upon the contrast setting of the machine. In order to avoid error, the machine would require adjustment to maximum exposure. However, when operating the machine at maximum exposure, very fine black lines on a white background would not reproduce due to the overexposure produced by the white background. Hence, fine print would be diluted or washed out whereas the heavy letters would reproduce correctly. Conversely, at an exposure which is correct for the fine print, the heavy print would be erroneously reproduced.

Another variation of this form of the invention includes the preprinting of the background material with words, shapes, or forms forming barely perceptible graphics thereon to form a composite background for a document intended to produce confusion with the graphical information imprinted on the preprinted or composite background. The graphical information creates a visual image sufficiently contrasted from the preprinted graphics to be readily distinguished therefrom by the human eye but of insufficient contrast to produce a useful image in a copying machine so that reproduction of the image produces an unitelligible copy. A white background preprinted with light gray graphics and then imprinted with graphical information as described above to force the machine to operate at maximum contrast would cause the background confusion patterns or graphics to reproduce as dense or as black as the graphical information, thus leading to confusion and unintelligibility.

Still another variation of this form of invention includes the printing of black, low-contrast graphical information and white, high-contrast graphical information on a low-contrast background so that when copied in a typical copying machine, either the low-contrast black graphical information, or the high-contrast white graphical information would reproduce, depending upon the exposure setting of the copying machine. I have found that an original with a red background imprinted with both black and white graphical information cannot be reproduced as an intelligent copy at any one condition of exposure.

The above illustrations are exemplary only and it should be understood that variations of this form of the invention are contemplated with employ specially prepared backgrounds having graphical information imprinted thereon varying over a wide range of reflectances and combinations of reflectances in the details of the individual characters of such graphical information which are beyond the range of contrast recognition and resolution of a conventional copying machine at any one exposure setting thereof. Also, this form of the invention is not restricted to black, white and intermediate scales of gray shading, but can include combinations of any colors which are sufficiently contrasted on the original to permit the readability thereof but which will reproduce as black or shades of gray when processed through conventional copying machines.

Figure 2:
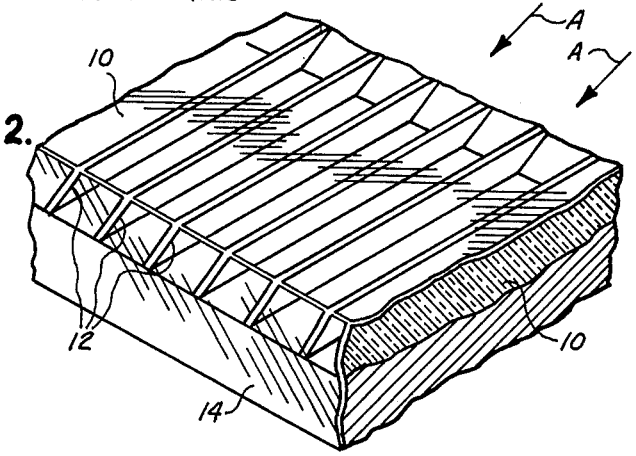
FIG. 2 is a fragmentary, perspective, exaggerated view of a copy resistant document constructed in accordance with one form of this invention.

Still another form of this invention for producing copy resistant documents is to provide obliterating or interference patterns on the original document that are related to the angle at which the document is viewed. Normally, a manuscript or document is read at some angle away from the plane perpendicular to the printed document and generally, at an angle, ranging approximately from 50° to 70° to the plane of the document. However, the typical copying machine incorporates optics for viewing the document perpendicularly thereto because viewing at an angle tends to distort and prevent accurate focusing on the graphical information imprinted on the document by the copying machine optics, thereby producing a poor copy. Referring now to FIG. 2, a film 10 of transparent material is provided with a series of parallel and equally spaced opaque planes 12 disposed at angles of from 50° to 70°, and preferably 60° to the horizontal. Film 10 is placed over an original document 14 and can be adhesively or otherwise fixedly secured thereto. These opaque planes 12 may be black or reflective, and extend from the top surface of film 10 to the bottom surface thereof and serve as "blinds" or shutters. When document 14 is viewed at an angle of 60° to the plane thereof, as in normal reading and as indicated by the arrows A in FIG. 2, planes 12 appear only as end lines and offer no significant impairment to readability. However, when document 14 is viewed perpendicularly to the plane thereof, as by the optical sensor in conventional copying machines, the angularly oriented planes 12 conceal the graphical information on document 14 and appear as a black or reflective surface, thereby causing the machine to produce an obliterated and completely useless copy. Film 10 can be formed of any suitable transparent plastic material as a sheet having a thickness of about 0.002 inches, the opaque planes 12 being approximately 0.0001 of an inch thick and spaced at 0.001 inch intervals. It should be understood that the above dimensions are illustrative only and that they may vary widely, as desired, within the purview of this invention.

Figure 3:
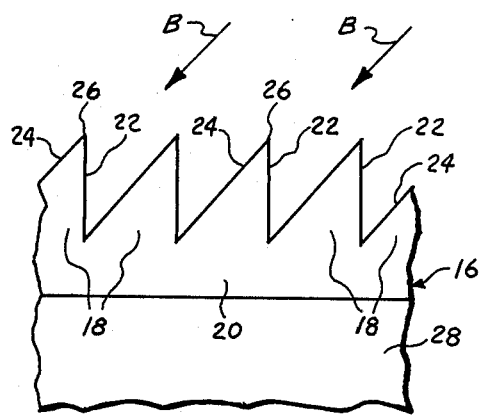
FIG. 3 is a fragmentary side elevational view, on a greatly enlarged scale, of another form of a copy resistant document of this invention.

Another variation of this form of the invention is the use of an overlay in the form of a transparent plastic film 16 having a serrated upper surface or sawtooth formation as shown in the exaggerated view of FIG. 3. The serrated formation comprises a plurality of uniformly spaced, triangularly shaped teeth 18, projecting upwardly from a base 20. Each tooth 18 is provided with a generally vertical surface 22 and an inclined or sloping surface 24 converging toward surface 22 and meeting therewith at a crest portion 26. Film 16 is formed of a suitable transparent plastic material as a sheet having a base thickness of about 0.001 inches. Teeth 18 are spaced at approximately 0.001 inch intervals and have a depth of about 0.002 inches. Again, these dimensions are exemplary only and can vary widely, as desired. Sloping surfaces 24 can be either black or reflective, as indicated by the heavy lines on surfaces 24. When the underlying document 28 is viewed perpendicularly to the plane thereof by conventional copying machine sensor, the image sensed is a solid surface completely masking the graphical information on document 28. However, when observed from a convenient viewing angle by the human eye, or in the direction of arrows B in FIG. 3, document 28 is easily readable.

Figure 4:
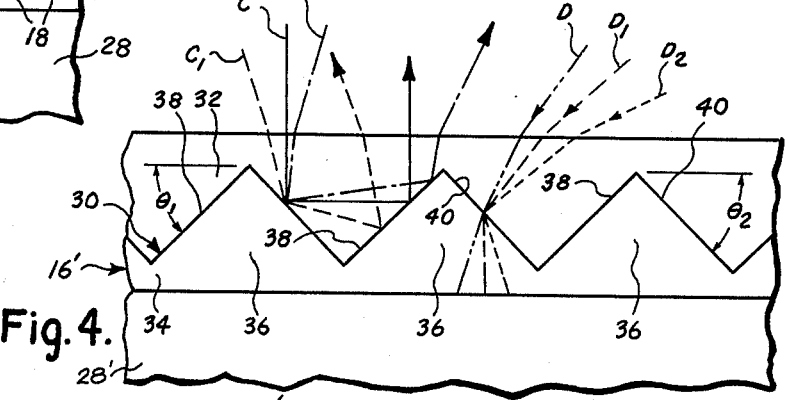
FIG. 4 is a fragmentary side elevational view, greatly enlarged, of still another form of a copy resistant document of the present invention.

Still another variation embraced by this "obliterating or interference pattern" concept is the provision of means in a transparent film overlying a document for effecting total internal reflectance of light passing through the film in a direction substantially perpendicular to the plane of the film. As shown in FIG. 4, a transparent, plastic film 16' overlying document 28' is provided with an internal serrated formation 30 interposed between the upper and lower surfaces of film 16' and separates the latter into an upper region 32 and a lower region 34, the region 32 being formed of a material having a higher optical index of refraction than the material of region 34. Serrated formation 30 consists of a plurality of uniformly spaced, triangularly shaped teeth 36 extending transversely of film 16', each tooth 36 having a pair of sloping surfaces 38 and 40 converging toward each other and forming angles $\theta_1$ and $\theta_2$ with a horizontal plane cut through film 16. Light rays extending in the direction of arrows C, $C_1$ and $C_2$ and striking the upper surface of film 16 at incident angles perpendicularly or substantially perpendicularly thereto, or within a range of angles between $C_1$ and $C_2$, will inpinge against surface 40 and be reflected thereby onto surface 38 of the adjacent tooth 36, and then be reflected from the latter outwardly through the upper surface of film 16' to undergo complete or total internal reflectance. Accordingly, the graphical information on document 28' cannot be seen and is completely obliterated when viewing such document from a direction substantially normal to the plane thereof, as in the conventional copying machine. However, when viewing document 28' from a direction or angle of incidence disposed exteriorly of the limits defined by arrows $C_1$ and $C_2$, such as those identified by arrows D, $D_1$, and $D_2$ for example, the graphical information on document 28' can be easily read. The limits defining the angles of incidence that will undergo total internal reflectance are dictated by the combination of materials of different refractive indices and the sizes of angles $\theta_1$ and $\theta_2$.

The material forming region 34 can be a suitable transparent adhesive securing the material of region 32 to document 28' or region 34 can be a transparent plastic material formed integral with the material or region 32 as a composite film secured to document 28' by a separate adhesive means.

Figure 5:
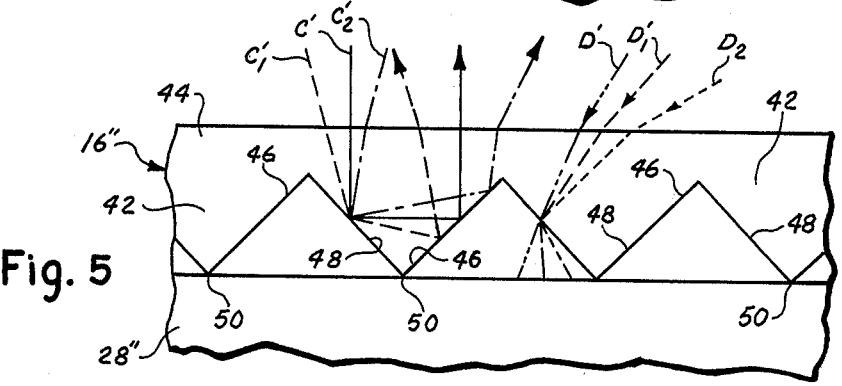
FIG. 5 is a fragmentary side elevational view, greatly exaggerated, of another embodiment of the form of copy resistant document shown in FIG. 4.

A further embodiment of this variation is shown in FIG. 5 and comprises a transparent, plastic film 16" adapted to overlie a document 28" and provided with a serrated lower surface or sawtooth formation consisting of a plurality of uniformly spaced, triangularly shaped teeth 42 projecting downwardly from an upper base 44. Each tooth 42 is provided with a pair of inclined or sloping surfaces 46 and 48 converging toward each other and meeting at a crest portion 50, surfaces 46 and 48 forming angles $\theta'_1$ and $\theta'_2$ with a horizontal plane cut through film 16". These crest portions 50 of teeth 42 engage the upper surface of document 28" in the assembled relation. The spaces or cavities defined by adjacent teeth 42 are filled with air, which has an index of refraction different from that of the material of film 16". This embodiment is effective in the same manner as the embodiment shown in FIG. 4 for producing total internal reflectance of light passing through film 16" in a direction substantially perpendicular to the plane thereof, as indicated by the arrows C', C'$_1$ and C'$_2$ to obliterate the graphical language on document 28". When viewing document 28" from a direction or angle of incidence exteriorly of the limits defined by arrows C'$_1$ and C'$_2$, such as those identified by arrows D', D$_1$' and D$_2$', the graphical information on document 28" is clearly readable.

Figure 6:
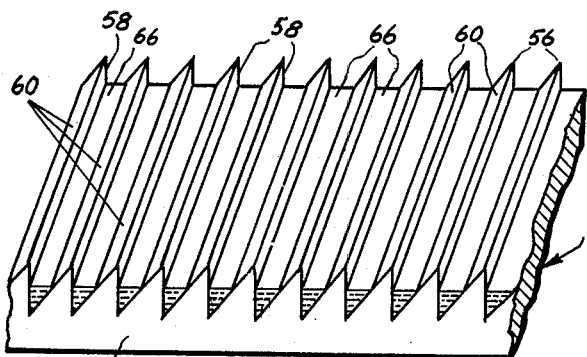
FIG. 6 is a fragmentary, perspective, exaggerated view of still another form of a copy resistant document of this invention.
Figure 7:
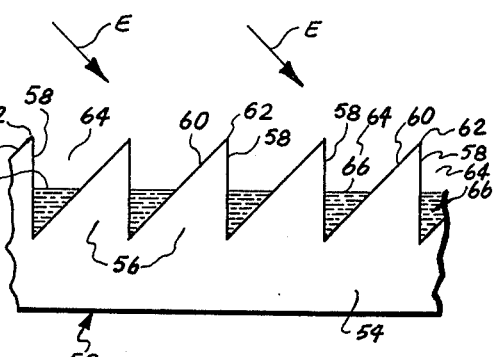
FIG. 7 is a fragmentary side elevational view, on a greatly enlarged scale, of the document shown in FIG. 6.

Rather than employ a separate film superimposed on a document, the background sheet itself can be embossed in such a manner so as to provide a sawtooth pattern in the top surface thereof. As shown in FIGS. 6 and 7, a background sheet of material 52, preferably formed of a base colored paper, such as orange for example, is provided with a substrate 54 having a plurality of uniformly spaced, triangularly shaped teeth 56 projecting upwardly from substrate 54 and extending crosswise thereof. Each tooth 56 includes a generally vertically extending surface 58 and an inclined sloping surface 60 extending upwardly at an angle in converging relation with surface 58 and meeting therewith at an apex on crest 62. These teeth 56 define cavities 64 therebetween which are partially filled with black ink 66 up to a level approximately midway between the roots and crests of adjacent teeth 56. While not used in a limiting sense, a typical sheet 52 may have an overall thickness of 0.0025 inches with teeth 56 spaced at 0.001 inch intervals and the inked portion of the cavities therebetween having a width of approximately 0.0005 inches, or approximately one-half the spacing between the crests of adjacent teeth 56. Thus, when sheet 52 is viewed from a direction normal to the plane thereof, it will appear as 50% black and 50% orange depicting alternating black and orange, strips of substantially equal widths. When viewed from a convenient reading angle generally normal to sloping surface 60, or from the direction indicated by arrows E in FIG. 7, sheet 52 will display a substantially completely orange color.

Graphical information imprinted on the sloping surfaces 60 of the embossed or serrated surface of sheet 52 will produce a document easily read at a slight angle relative to the plane of such document, or in the direction of arrows E in FIG. 7, because the background for such graphical information is of a relatively higher reflectance. At a viewing angle normal to the plane of the document such as are employed in the optics of conventional copying machines, the background displayed is 50% black to effect a reduction in contrast between the background and the graphical information to an unacceptable low level thereby causing such copying machines to produce unsatisfactory copies.

Figure 8:
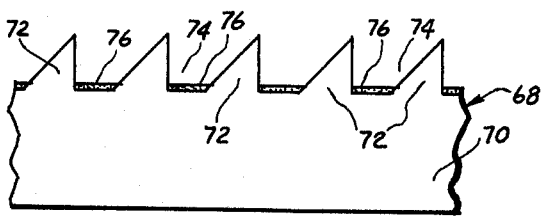
FIG. 8 is a view similar to FIG. 7 illustrating another embodiment of the form of this invention shown in FIG. 7.

FIG. 8 illustrates a modified sawtooth pattern embossed in the top surface of a sheet of material 68 comprising a substrate 70 having a plurality of spaced apart teeth 72 projecting upwardly therefrom and extending transversely thereof. Teeth 72 are of a lesser height than teeth 56 and define arcuately shaped cavities 74 between the lower ends thereof. Cavities 74 are partially filled with black ink 76, as shown in FIG. 8, to cover approximately 50% of sheet 68 when viewed perpendicularly to the plane thereof in the same manner and for the same purpose described above in connection with the embodiment of FIG. 7.

Figure 9:
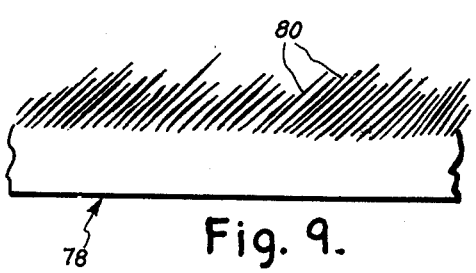
FIG. 9 is a fragmentary side elevational view, greatly exaggerated, illustrating still another embodiment of a copy resistant document constructed in accordance with the present invention.

Still another variation contemplated by this form of the invention is to treat the top surface of the background sheet upon which graphical information is to be imprinted in such a manner as to develop surface irregularities thereon having a very fine grain provided with a surface reflectance which is dependent on the viewing angle. As shown in FIG. 9, the upper printing surface of a background sheet of material 78 is roughened to produce a nap 80 consisting of a multiplicity of fibers extending upwardly from sheet 78 and generally oriented at an angle relative to the plane of sheet 78. This roughened condition can be generated by conventional embossing techniques, by simply abrading or brushing the upper surface of sheet 78 in one direction by a suitable tool, or any other suitable process. In any event, the upper surface of sheet 78 is coated by directing a spray of an orange colored pigment or dye, for example, on sheet 78 at an angle, or in the direction of arrows F, generally corresponding to the angle at which sheet 78 would be viewed for reading. The orange colored material deposited on nap 80 of sheet 78 which is of a different color from the pigment or dye, such as a black or dark color for example, causes the document to appear completely orange when viewed along the spray axis or in the direction of arrows F. When viewed normal to the plane of sheet 78, the latter appears as a mixture of orange and black. Graphical information imprinted on the surface irregularities forms a document readable at typical human eye viewing angles but creating a poor image for reproduction by a copying machine which views the document perpendicularly to the plane of the latter. The graphical information applied to sheet 78 preferably should be of the same reflectance characteristics as sheet 78 to achieve maximum degradation of the copy produced by a conventional copying process.

A further variation contemplated by this form of the present invention is to imprint only portions of each letter or character of the graphical information on the base sheet of the original document with the remaining portions of such letters and characters being imprinted on the top side of a transparent film overlying the base sheet and slightly offset therefrom to render the composite graphical information on the document readable when viewed at an angle approximately 60° to the plane of such document. However, when the document is viewed at an angle of 90° to the plane thereof, as by the optics in conventional copying machines, the letters and characters forming the composite graphical information perceived by such optics and transferred to the copy are unintelligible.

Still another variation contemplated by this form of the invention employs the use of minute, solid globules of a colored pigment deposited on the surface of a low reflectance background material to form a composite background for graphical information to be imprinted thereon. When such background material is viewed perpendicular to its surface, it will have a composite reflectance depending upon the ratio of the area covered by the pigment globules to the total area. When the background material is viewed at an angle of 60° to the plane of the material, as in normal reading, the composite reflectance will be the ratio of the area covered by the pigment globules to the total projected area at that angle.

Figure 10:
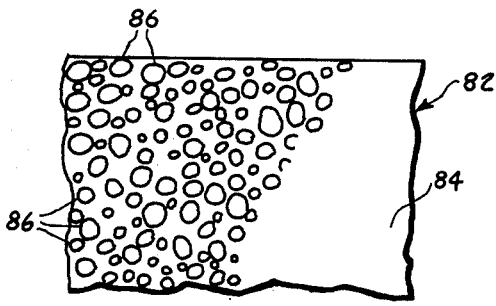
FIG. 10 is an exaggerated fragmentary plan view of yet another form of copy resistant document of this invention.
Figure 11:
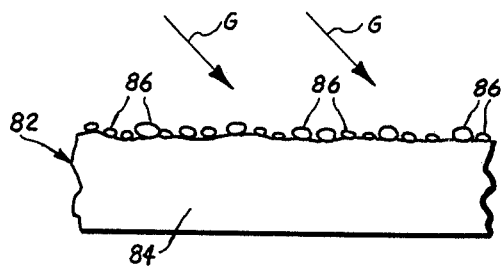
FIG. 11 is a fragmentary side elevational view, of the document shown in FIG. 10.

Referring now to FIG. 10 and 11 to illustrate this concept, there is shown a document, generally designated 82, comprising a background sheet of material 84, preferably of a low-reflectance color, such as black for example, having a multiplicity of minute globules 86 of an orange pigment disposed on the top surface of sheet 84. Globules 86, which are sprayed on sheet 84, are of varying sizes and shapes and are irregularly or randomly oriented relative to each other. The specific size of each globule 86, which may on the order of 0.001 inches in diameter for example, is not critical so long as it is very small relative to the size of the graphical information detail imprinted on sheet 84. When document 82 is viewed perpendicularly to the plane thereof, sheet 84 appears as a mixture of black and orange, however, when viewed at some angle less than 90° to the plane of document 82, such as in the direction of arrows G in FIG. 11, sheet 84 will appear more orange than black, the proportion of orange perceived being dictated by the specific viewing angle and the shape and spacing of globules 86. Graphical information imprinted on background sheet 84 preferably should be of the same reflectance characteristics, with respect to color and density, as sheet 84 on which the orange pigment globules 86 have been applied to achieve maximum degradation of the copy produced by a conventional copying process. I have found that documents prepared in the manner set forth above are effective to defeat virtually all known copying machines.

The following is cited as an example of this method in practicing this form of the invention, it being understood that such example is illustrative only and is not used in a limiting sense.

EXAMPLE

Figure 12:
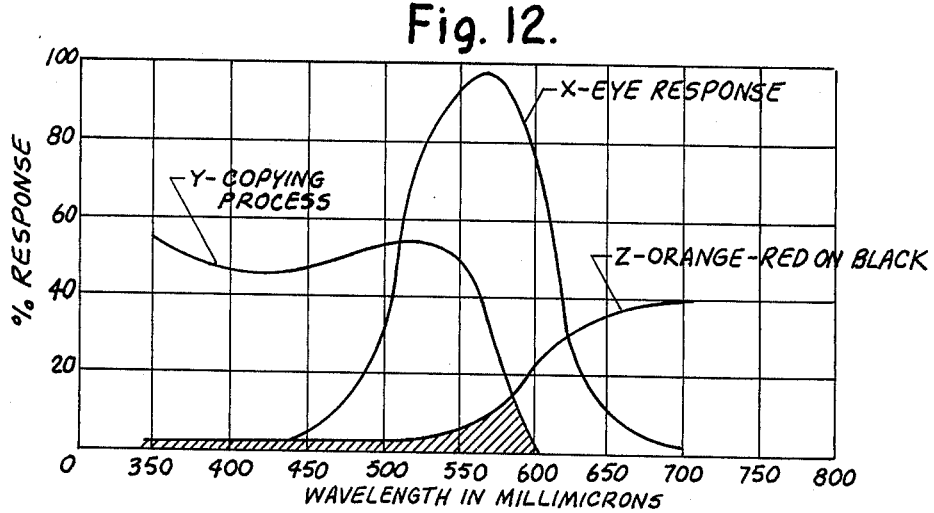
FIG. 12 is a diagrammatic view similar to FIG. 1 illustrating a graph which correlates the color or spectral responses of the human eye and a copying machine in percentages to wavelengths of light in millimicrons.

The basic stock material used was a dull black paper of any suitable weight having a reflectance of less than 5% at wavelengths from approximately 300 to 1000 mu. This basic stock material was spray coated with an orange/red ink having a 10% reflectance at wavelengths of 575 mu and an 80% reflectance at wavelengths of 625 mu, such that the total reflectance of the coated sheet did not exceed 40% at wavelengths of 650 mu. FIG. 12 graphically illustrates the combined effect of an orange-red ink sprayed on a black substrate on a graph which correlates the spectral or reflective response of the eye and a typical copying process in percentages to light wavelengths measured in millimicrons under conditions of uniform illumination over the spectrum. Curve X identifies the response of the eye; curve Y the response of a typical copying system; and curve Z represents the combined reflectance of a coating of orange-red pigment on a black substrate or background. The shaded area between curves y and Z represent the reflected light which reaches the detector or sensitized region of the copying system. The orange-red ink was sprayed in such a manner as to form minute globules on the basic black background whereby the sheet appeared more orange when viewed at an angle slightly less than 90° to the plane of the sheet than when viewed normal to the surface of the sheet. This coated sheet was then oversprayed with a thin film of varnish or lacquer to preclude the black graphical information, subsequently applied to such sheet, from diffusing into the orange/red background and to minimize the surface scattering, particularly in the spectral region of low reflectivity. This composite sheet can be used as an original in conventional typewriters or in any printing process using conventional black ink, or as feed stock to a copying machine to produce non-reproducible copies from the copyable original. In any event, the black graphical information imprinted on the composite orange/red background offered sufficient contrast to render the document easily readable by the human eye at typical viewing angles but of insufficient contrast to produce a useful image in a copying machine whereby a copy produced by the latter was unintelligible.

It should be appreciated that in most applications it is necessary to treat and render only selective portions of a document copy resistant in order to produce worthless copies by known copying processes, and the concept is applicable to all the forms of the invention hereinbefore described and those forms that will hereinafter be described. The portions or areas selected to be copy resistant or non reproducable by conventional copying machines can be artistically treated so as to form an aesthetic or pleasing background for the graphical information imprinted thereon. For example, a corporate insignia, a trademark, or other identifying symbols can be employed as the background pattern in these selected portions.

While numerous examples can be cited to illustrate the above concept, the following is one illustrative example of preparing a non-uniform background to obtain a desired loss of intelligibility in the copy in accordance with the last mentioned copy resistance technique described.

EXAMPLE

A dense, gray-black ink was spray coated along the opposite sides and bottom marginal edges of a sheet of white paper to form a relatively dark border therealong about 1.5 inches wide. The ink was sprayed inwardly of this border at progressively lighter shades to form a tapering lighter background inwardly of the border and terminating in a white background centrally of the document. This sheet was oversprayed with an orange/red ink to form minute globules thereon similarly to that disclosed in the first Example, except that the reflectance at the center of the sheet was maintained as large as desired while the reflectance along the black border was maintained below 30%. A suitable lacquer or varnish may be sprayed over the multicolored original, as desired. Black graphical information was imprinted on the multi-colored sheet to form a document which was processed through a conventional copying machine. While readability of the original was satisfactory, the intelligibility of the copy produced by the copying machine was low because the graphical information along the darkened border was unreadable. The copy produced depicted a clear intelligible central portion but an obliterated marginal edge portion. As previously mentioned, it was only necessary to obliterate portions of the graphical information of the copy to render it worthless. The obliteration of certain words, sentences, or one marginal edge of the graphical information on the copy generally would defeat its utility. However, top security original documents and those of an extreme sensitive nature should be entirely treated to render them completely uncopyable to preclude any possibility of deciphering copies made therefrom.

Still another form of this invention for producing copy resistant documents is the utilization of photochromic, phototropic or photothermic materials, which change their optical properties such as color and/or optical density when subjected to changes in light or heat, respectively. These materials can be used as dyes, pigments, inks, films or papers to modify the contrast between the background sheet and the graphical information imprinted thereon under changing conditions of light and heat. These materials may be used in an almost infinite variety of combinations to effect a change in either color or density contrast to impair the reproduction of an orginial document by various known copying machines. As a simple illustration of this method, a photochromic orange dye is employed as the background color upon which is imprinted black graphical information. This provides a good contrast for suitable readability under normal illumination conditions but when exposed to the high intensity illumination incorporated in many copying machines, the orange background darkens to substantially reduce the contrast between the background and the graphical information observed by the copying machine optics, to impair the reproductability of the original.

It should be understood that photochromic, phototropic or photothermic materials, hereinafter referred to only as "photochromic" materials, can be in the form of a dye added to the base stock paper material to form the background thereof, as a coating on the paper stock, as a printing ink, or as a film to be applied to the paper stock after the graphical information has been imprinted thereon. The term "photochromic" as used herein is intended to include any and all materials which undergo a change in their optical properties, such as color and/or optical density when subjected to changes in light intensity and embraces materials which undergo a permanent change of color, those that revert back to their original color, or those that may require a different stimulus in order to revert back to their normal or inactivated state.

A photochromic material for this application should respond to, or be activated by, the radiation present in the illumination source of the copying machine and should not be activated by those elements of the radiation spectrum of the sun and artificial illumination not present in the copy machine so as to prevent or minimize the changing of the contrast of the document under normal viewing conditions. As a generalization, the illumination sources in copy machines have a very low percentage of their radiation in the ultraviolet portion of the spectrum, whereas sunlight is strong in ultraviolet and the predominance of photochromic materials studied to date are activated in the ultraviolet region and show a color or density change in the visible portion of the spectrum. Also, most photochromic materials, by design, do not change their absorption or reflection properties at their excitation wavelengths; hence, the longer they are exposed, the greater the color change to be expected. In order words, the spectral change is the product of the intensity of the illumination at the excitation wavelength and time, or until the entire photochromic materials has converted, as the limit.

In accordance with this form of the invention, the photochromic material should be excited in the visible or infra red portion of the spectrum and should "darken" or react at the excitation wavelength as well as elsewhere in the spectrum, such that the material arrives at a photo-stable condition as a function of the light intensity and will not go to total conversion with long time exposure at low levels of illumination. The dithizonates and the heavy metal complexes of dithizone are excellent example of a class of suitable photochromic materials.

As an illustration, a solution of mercury bis-dithizonate, which is orange in its unexcited state and shifts to blue upon excitation by radiation which includes blue, can be applied as a thin, transparent coating on orange paper. Under normal illumination, the film remains orange with a slight shift to the yellow and readability is not impaired. With increasing illumination, as in a copy machine, the film shifts to the blue. This blue "filter" in combination with the orange background appears almost black, thus reducing the contrast between the background and the graphical information printed thereon to a very low level. It may be desirable to employ an ultra violet absorber in conjunction with the dithizonate to protect the dithizonate from the ultra violet radiation, such as occurs in normal sunlight and which may have a harmful effect on the dithizonate.

In lieu of a photochromic film, the graphical information can be printed with an opaque orange photochromic ink, produced for example, from a dithizonate and which darkens to a gray-brown upon high intensity irradiation in the visible portion of the spectrum to degrade the copy produced by a light activated copying machine. While dithizonates and heavy metal complexes of dithizone are preferably used as the photochromic materials in the above examples because of their sensitivity in the visible portion of the spectrum and their rapid responses to varying illumination, it should be understood that this invention is in no manner limited to the use of such dithizonates but can employ any suitable photochromic materials within the purview of this invention.

A still further form of this invention utilizes ultra violet and infra red absorbing materials, such as those offered by the American Cyanamil Corp. of Boundbrook, New Jersey, which are transparent in the visible spectrum and which can be added to the background materials, the film or the inks. The inclusion of these materials in the document to be protected serves to limit the spectral band width of the light reflected from the document to the band width of the eye. Accordingly, the readability of the document will not be affected but any copying process which is sensitive in the ultra violet or the infra red regions of the spectrum will be degraded. For example, such ultra violet and infra red absorbing materials may be included in the photochromic orange pigment applied to the substrate in the example previously described. Indeed, all of the copy resistant documents hereinbefore described can be treated with either an infra red or ultra violet absorbing material or a combination of both to attenuate the reflected infra red and/or ultra violet energy so as not to affect contrast for human eye readability but to materially affect or reduce contrast for creating a poor image for reproduction by a copying machine.

From the foregoing, it is apparent that the present invention fully accomplishes its intended objects and provides methods for treating or producing original documents in such a manner as to at least inhibit the production of intelligible copies therefrom by conventional copying machines.

Preferred forms of this invention having been disclosed in detail, it is to be understood that modifications thereof can be made without departing from the broad spirit and scope of this invention.

I claim:
1. A copy resistant document comprising: a sheet of material having an upper irregular surface comprised of a multiplicity of fibers extending upwardly from said sheet at angles less than 90° relative to the plane of said sheet, said fibers having a coating of a colored material thereon applied by spraying at an angle corresponding to the angle at which said document would normally be viewed for reading by the human eye, and graphical information imprinted on said irregular surface to produce a document easily readable at said normal human eye viewing angle but unreadable when viewed perpendicularly to the plane of said document to create a useless image for reproduction by a copying machine.

2. A method of forming a document to resist reproduction by copying machines comprising: treating the upper surface of a black sheet of material to form surface irregularities thereon consisting of a multiplicity of fibers extending upwardly from said sheet generally at an angle less than 90° relative to the plane of said sheet, coating said fibers by directing a spray of colored material thereon at an angle corresponding to the angle at which said sheet would normally be viewed for reading by the human eye, and printing graphical information on said surface irregularities to produce a document readable at typical human eye viewing angles, but unreadable when viewed perpendicularly to the plane of said sheet to create a useless image for reproduction by a copying machine.

3. A method according to claim 2 wherein the treating of said sheet comprises brushing the upper surface thereof in one direction.

* * * * *